Nov. 1, 1960

F. D. KAISER ET AL 2,958,817

RECTIFIER CIRCUIT

Filed June 20, 1957

WITNESSES:
Bernard R. Giegner
Clement L. McHale

INVENTORS
Francis D. Kaiser and
Kevin F. Friedrich.
BY
F. E. Browder
ATTORNEY

United States Patent Office 2,958,817
Patented Nov. 1, 1960

2,958,817

RECTIFIER CIRCUIT

Francis D. Kaiser and Kevin F. Friedrich, Sharon, Pa., assignors to Westinghouse Electric Corporation, East Pittsburgh, Pa., a corporation of Pennsylvania Filed June 20, 1957, Ser. No. 666,956

14 Claims. (Cl. 321—26)

This invention relates to electric power translation systems of the type in which a plurality of asymmetrically conducting devices are used to interchange power, in one direction or the other, between a first polyphase system and a second system which may be either a direct-current system or an alternating-current system having a frequency which is different from the first polyphase system.

It has been found that the maximum current rating of certain asymmetrically conducting devices, such as semiconductor rectifiers and large ignitrons, is determined more by the peak current rather than by the average current carried by such devices. In order to take greater advantage of the current-carrying capacity of said devices, it is desirable that each device have a lower peak current and also conduct for longer periods during each cycle of the alternating-current electric power interchanged in a translation system. It is also desirable in a translation system used to convert a polyphase alternating current to a unidirectional current that the alternating current applied to the asymmetrically conducting devices include a larger plurality of phases in order to obtain a smoother unidirectional current at the output of the translation system.

It is an object of this invention to provide a new and improved electric power translation system.

Another object of this invention is to provide a new and improved connection arrangement between a transformer means and a plurality of asymmetrically conducting devices in a translation system for electric power.

Another object of this invention is a new and improved electric power translation system in which a plurality of asymmetrically conducting devices each conducts for a longer period of each cycle of the alternating current electric power interchanged and a larger number of phases of the alternating current are applied to said devices so that a plurality of said devices instantaneously operates in parallel to carry the total curent handled by said translation system.

A more specific object of this invention is to provide a delta, twelve-phase, sextuple zigzag, diametric circuit connection between a transformer means and a plurality of asymmetrically conducting devices in which the current rating of said devices is determined more by the peak current than by the average current carried by said devices in order to take greater advantage of the current-carrying capacity of said asymmetrically conducting devices.

Other objects of the invention will in part be obvious and will, in part, appear hereinafter.

For a fuller understanding of the nature and objects of the invention, reference should be had to the following detailed description, taken in conjunction with the accompanying drawing, in which.

Figure 1:
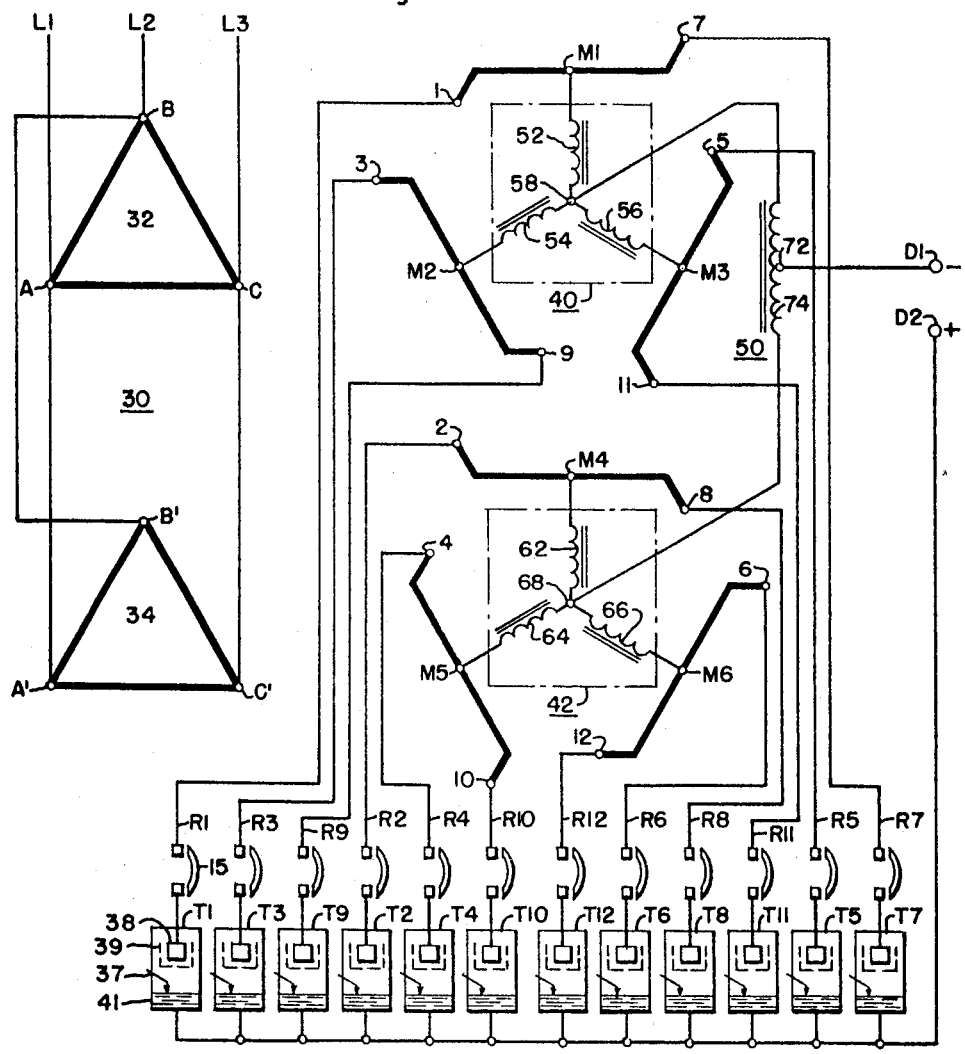
Figure 1 is a schematic diagram of one embodiment of this invention.

Referring to the drawing and Fig. 1 in particular, there is illustrated an electric power translation system of the type in which power is taken from a three-phase power supply system, including the power leads L1, L2 and L3, and is transmitted through a plurality of asymmetrically conducting devices to a unidirectional current circuit, having the power leads D1 and D2. The invention will be described as if the power is transferred from the three-phase power leads L1, L2 and L3 to the unidirectional current power leads D1 and D2, but it is to be understood that by the use of well-known inverter control connections, the direction of power flow could be reversed. The unidirectional current power leads D1 and D2 will be described as if they were a direct-current power system which receives power from the three-phase power system at L1, L2 and L3, but it is to be understood that the unidirectional current power leads at D1 and D2 could be either the anode terminal circuit or the cathode terminal circuit of one phase (or the phase) of a second different frequency alternating-current system which receives power from or which transmits power to the three-phase system at L1, L2 and L3 provided that suitable rectifier controlling means are provided.

The plurality of asymmetrically conducting devices is illustrated as comprising twelve ignitron tubes T1 to T12, which may be taken to be broadly representative of twelve, single-phase, asymmetrically conducting devices of a type in which the rating of each device is determined more by its peak current than by its average current. Each ignitron tube comprises a main anode 38, a grid 39, an ignitor 37 and a mercury or other vaporizable cathode pool 41. The twelve cathode leads of tubes T1 to T12 are illustrated as being all connected to the positive conductor D2 of the direct-current bus. The twelve anode leads of the tubes T1 to T12 comprise twelve rectifier leads R1 to R12, respectively, the leads and the tubes being numbered in accordance with the sequence of the phases in a twelve-phase circuit.

The transformer means which is provided as part of the translation system comprises a three-phase power transformer 30. The power transformer 30 may comprise a three-phase power transformer as shown, or three single-phase power transformers. In general, the power transformer 30 is connected between the three-phase power supply system at the power leads L1, L2 and L3 and the rectifier leads R1 to R12 to apply twelve-phase, alternating-current electric power to the ignitron tubes T1 to T12. The power transformer 30 comprises two primary winding sections 32 and 34 and six secondary winding sections 1–7, 3–9, 5–11, 2–8, 4–10 and 6–12. The three-phase primary winding section 32 is connected in a delta arrangement, the three-phase power supply system at L1, L2 and L3 being connected at the terminals A, B and C respectively of the primary winding section 32. The three-phase primary winding section 34 is connected in parallel circuit relationship with the primary winding section 32, the three-phase power supply system at L1, L2 and L3 being connected at the terminals A', B' and C', respectively, of the primary winding section 34. The secondary winding section 1–7 includes a mid-tap at M1 and in similar fashion the balance of the secondary winding sections 3–9, 5–11, 2–8, 4–10 and 6–12 each includes a mid-tap at M2 to M6, respectively. As illustrated, the secondary winding 1–7 includes a main portion which is responsive to the primary phase winding connected between the terminals A and C of the primary winding 32 and two smaller portions which are responsive to the primary phase winding connected between the terminals A and B of the primary winding 32.

The connection used in the secondary winding section

1–7, which is commonly called a zigzag connection, produces a resultant voltage between the mid-tap M1 and the terminal 7 which is displaced in phase from the voltage in the main portion of the secondary winding 1–7 by a phase angle of 15° in a counterclockwise direction. The voltage between the mid-tap M1 and the terminal 1 will be 180° out-of-phase with the voltage between the mid-tap M1 and the terminal 7 of the secondary winding 1–7. The secondary windings 3–9 and 5–11 are connected in similar fashion to the secondary winding 1–7 so as to produce six rectifier phase voltages which are displaced by 15° from the voltages across the main portions of the secondary windings 1–7, 3–9 and 5–11, respectively. The secondary windings 2–8, 4–10 and 6–12 are each connected in a zigzag connection also to produce six rectifier phase voltages which are displaced by 15° from the voltages across the main portions of the secondary windings 2–8, 4–10 and 6–12, respectively. The phase shift produced in the secondary windings 2–8, 4–10 and 6–12 is in an opposite direction to the phase shift produced in the secondary windings 1–7, 3–9 and 5–11. Therefore, the two sets of six rectifier phase voltages produced by the secondary windings of the power transformer 30 are displaced from each other by a total of 30°. The diametrically opposite ends of each of the secondary windings 1–7, 3–9, 5–11, 2–8, 4–10 and 6–12 of the power transformer 30 are each connected through one of the rectifier leads R1 to R12 to one of the ignitron tubes T1 to T12, respectively, through a suitable anode circuit breaker 15.

In common with other polyphase rectifier systems, the rectifier connections described above are such that different rectifier phases, which are energized by the instantaneous voltages of different phases of the polyphase circuit, are at times operated in parallel with each other so as to simultaneously supply power to or receive power from the same unidirectional current power circuit or bus. As is well known in the art, it is therefore necessary to provide suitable interphase transformer or reactance means 40, 42 and 50. The three-phase, interphase reactance 40 is represented as comprising three phase windings 52, 54 and 56 which are disposed on a magnetic core and connected in a star arrangement, the neutral side of each winding being connected at the terminal 58. The other side of the winding 52 is connected to the mid-tap M1 of the secondary winding 1–7. The other side of the windings 54 and 56 are connected in similar fashion to the mid-taps M2 and M3 of the secondary windings 3–9 and 5–11, respectively. The three-phase interphase reactance 42 is also represented as comprising three phase windings 62, 64 and 66 connected in a star arrangement with the neutral side of each winding being connected at the terminal 68. The other side of each of the windings 62, 64 and 66 are connected to the mid-taps M4, M5 and M6 of the secondary windings 2–8, 4–10 and 6–12, respectively. The interphase reactance 50 comprises a winding 74, having a mid-tap at 72, disposed on a magnetic core and connected between the neutral terminals 58 and 68 of the interphase reactances 40 and 42, respectively. The mid-tap 72 of the interphase reactance 50 is then connected to the negative lead D1 of the unidirectional current system to provide a return path for the unidirectional current which flows from the diametrically opposite ends of the secondary windings 1–7, 3–9, 5–11, 2–8, 4–10 and 6–12 of the power transformer 30. The interphase reactances 40, 42 and 50 are provided to develop the instantaneous voltage differences which are necessary to permit the parallel operation of two or more rectifier phases having terminal voltages which do not reach their peaks at the same instant and yet allow independent operation of the parallel rectifier phases. The interphase reactances 40, 42 and 50 are capable of absorbing or developing the necessary alternating-current voltage differences or ripple voltages to permit the parallel operation of a plurality of rectifier phases. For example, the interphase reactance 40, in cooperation with the interphase reactance 50, permits three of the ignitron tubes T1, T7, T3, T9, T5 and T11 to operate in parallel when the six phase voltages from the secondary windings 1–7, 3–9 and 5–11 of the transformer 30, respectively, are applied to the rectifier leads R1, R7, R3, R9, R5 and R11. In similar fashion, the interphase reactance 42, in cooperation with the interphase reactance 50, allows parallel operation of the ignitron tubes connected to the diametrically opposite ends of the secondary windings 2–8, 4–10 and 6–12 of the power transformer 30.

The invention is not limited to the particular interphase reactances 40, 42 and 50 which were chosen for illustration as there are many other kinds and connections of interphase reactance means.

Figure 3:
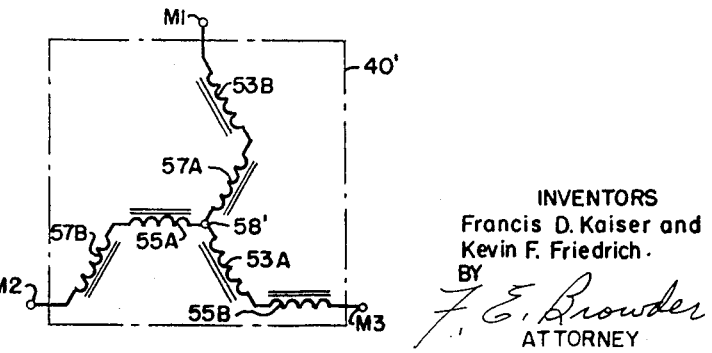
Fig. 3 is a partial schematic diagram of a third embodiment.

Referring to Fig. 3, in actual practice, the interphase reactance 40′ could be substituted for the interphase reactances 40 and 42. Each of the three phase windings which are each disposed on the leg of a magnetic core, are divided into two sections 53A and 53B, 55A and 55B, and 57A and 57B, respectively, which are then connected in a zigzag arrangement with a neutral terminal as indicated at 58′. The interphase reactance 40′ has the advantage that in operation the magnetomotive forces on each leg of the magnetic core due to the unidirectional currents, which flow in the windings of the interphase reactance 40′, are balanced and substantially add up to zero, assuming that the unidirectional currents which flow at the terminals M1, M2 and M3 of the interphase reactance 40′ are substantially equal.

The interphase reactances 40 and 42 will be designed for the second harmonic of the fundamental frequency of the three-phase power supply system at L1, L2 and L3. The interphase reactance 50 is designed for the sixth harmonic of the fundamental frequency of the three-phase power supply system at L1, L2 and L3.

In general, the connections described above between the power transformer 30, the rectifier leads R1 to R12, and the ignitron tubes T1 to T12 may be described as a delta, twelve-phase, sextuple zigzag, diametric connection. As previously described, the zigzag connection in each of the secondary windings of the power transformer 30 produces across the secondary windings of the power transformer 30, two sets of six rectifier phase voltages each separated from the other by 30°. Since six bi-phase voltages are obtained by the delta, twelve-phase, sextuple zigzag, diametric connection, twelve-phase rectifier operation may be provided by connecting each of the diametrically opposite ends of the secondary windings 1–7, 3–9, 5–11, 2–8, 4–10 and 6–12 of the power transformer 30 through one of the rectifier leads R1 to R12 to one of the ignitron tubes T1 to T12, respectively.

The operation of one group of secondary windings 1–7, 3–9 and 5–11 in the delta, twelve-phase, sextuple zigzag, diametric connection will now be considered. Because of the diametric connection of the secondary windings 1–7, 3–9 and 5–11 of the power transformer 30 through the rectifier leads R1, R7, R3 R9, R5 and R11 to the ignitron tubes T1, T7, T3, T9, T5 and T11, respectively, three of the latter ignitron tubes will be operating in parallel at any given instant of each voltage cycle of the three-phase power system at L1, L2 and L3. As previously described, any voltage differences, having a frequency which is the second harmonic of the fundamental frequency of the three-phase power system at L1, L2 and L3, existing between the outputs of the three ignitron tubes which are operating in parallel will be absorbed by the interphase reactance 40. The balance of the ignitron tubes T2, T8, T4, T10, T6 and T12 connected to the second group of secondary windings 2–8, 4–10 and 6–12 will operate in similar fashion so that at any given instant six of the twelve ignitron tubes T1 to T12 will be operating in parallel. The interphase reactance 50 is provided to absorb any voltage differences, having a frequency which is the sixth harmonic of the fundamental frequency of the three-phase power system at L1, L2 and L3, existing between the neutral terminals 58 and 68 of the three-phase, interphase reactances 40 and 42, respectively. Since at any given instant six of the twelve ignitron tubes T1 to T12 operate in parallel, each ignitron tube conducts for 180° of each cycle of the three-phase power supply system at L1, L2 and L3. The conduction of six ignitron tubes in parallel will progress in phase sequence in accordance with the reference numbers of the ignitron tubes T1 to T12. As one ignitron tube ceases to conduct, the next ignitron tube in phase sequence will begin to conduct so that six ignitron tubes are always conducting in parallel.

As previously described, the ignitron tubes T1 to T12 may be provided with any suitable ignitor energizing control circuit for energizing the ignitor 37 of each of the several tubes. As described, each of the ignitron tubes T1 to T12 constitutes a vapor-electric device having a single-phase space current path between an anode means and a cathode means and each vapor-electric device has its own cathode means. It is to be understood that the delta twelve-phase, sextuple zigzag, diametric connection can be used with any of the well-known semiconductor rectifiers in which the maximum current rating of the rectifier is determined more by the peak current than by the average current carried by the semiconductor rectifier.

In the embodiment shown in Fig. 1, a twelve phase rectifier system is illustrated in which a mid-tap of the transformer windings is used for the return circuit of the rectifiers. It is to be understood, however, that, in general, a bridge-type rectifier connection can be used in which twice as many rectifiers are required and in which each of the twelve rectifier phases or circuits contains two rectifiers in series with each other so that the voltages of the power leads can be doubled throughout the period. We have shown such a rectifier-bridge circuit in Fig. 2, in which the six secondary windings 1–7, 3–9, 5–11, 2–8, 4–10 and 6–12 are the same as in Fig. 1 without the mid-taps M1 to M6, respectively.

Figure 2:
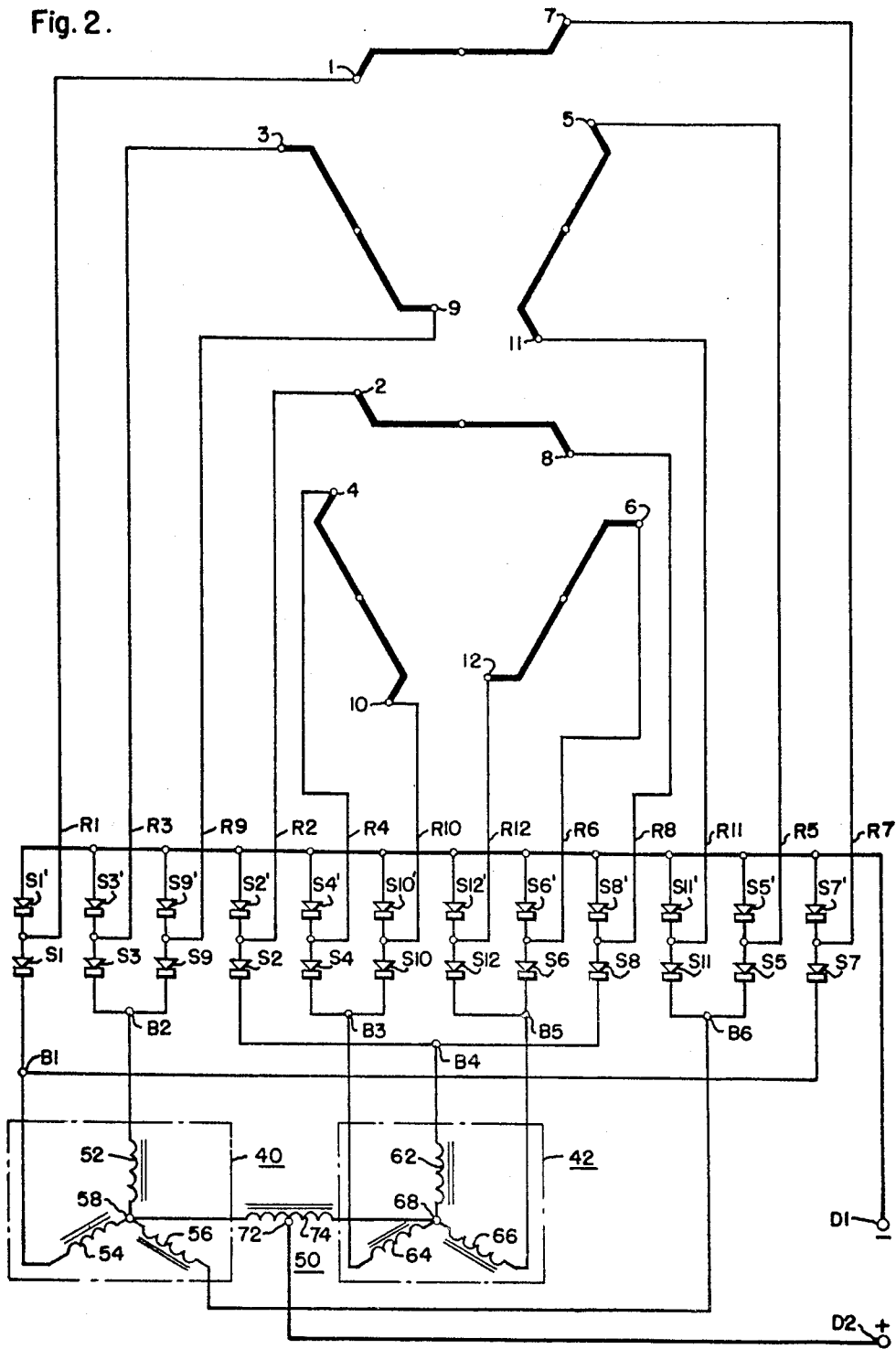
Fig. 2 is a schematic diagram of a second embodiment of this invention.

In the embodiment illustrated in Fig. 2, instead of having twelve ignitron tubes T1 to T12 as in Fig. 1, the system shown in Fig. 2 employs twelve rectifier devices S1 to S12 and, in addition, twelve more rectifier devices S1' to S12' each connected in a direct-current circuit or branch in series with its correspondingly numbered rectifier device without the prime in its reference number so as to provide six rectifier bridge circuits.

The six bridge points B1 to B6 in Fig. 2 are connected to the positive direct-current lead D2 through any suitable interphase reactance means such as the interphase reactances 40, 42 and 50. The interphase reactances 40 and 42 comprise the windings 52, 54, 56 disposed on a magnetic core and the windings 62, 64 and 66 disposed on a magnetic core, respectively. The three-phase, interphase reactances 40 and 42 are each connected in a star-connection with the neutral side of the respective windings being connected at the terminals 58 and 68, respectively. The other side of each of the windings of the interphase reactances 40 and 42 are each connected to one of the bridge points B1 to B6. The interphase winding 50 comprises a winding 74, having a mid-tap 72, disposed on a magnetic core. The interphase reactances 40 and 42 would be designed for the second harmonic of the fundamental frequency of the three-phase power system at L1, L2 and L3. The interphase reactance 50 would be designed for the sixth harmonic of the fundamental frequency of the three-phase power system at L1, L2 and L3. The rectifier bridge connection of Fig. 2 operates in similar fashion to the circuit shown in Fig. 1 and has the advantage that 180° conduction is maintained in each of the rectifier devices S1 to S12 and S1' to S12'.

In Fig. 1, the asymmetrically conducting devices are shown as being ignitron tubes. In Fig. 2, the asymmetrically conducting devices are shown by means of a conventional rectifier symbol which is intended to be applicable to any kind of asymmetrically conducting device. In carrying out this invention, it is contemplated that each individual asymmetrically conducting device shall be of a type in which the rating is determined more by the peak current rather than by the thermal capacity of the asymmetrically conducting device. Two examples of such asymmetrically conducting devices are the ignitron and any one of the large number of semiconductor rectifiers and our invention shall be understood as including the use of either one of these two general types of rectifiers.

The apparatus embodying the teachings of this invention has several advantages. The delta, twelve-phase, sextuple zigzag, diametric connection has the advantage of 180° conduction in each ignitron tube which makes greater use of the current-carrying capacity of available ignitron tubes or other asymmetrically conducting devices in which the maximum current rating is determined more by the peak current than by the average connection. This rectifier connection also has the advantage of lower peak current than many of the rectifier circuit connections commonly found in use. In addition, voltage variations at the power leads L1, L2 and L3 of the three-phase power-supply system, which are unbalanced as between the three phases, will affect at least several of the twelve-phase output voltages of the secondary windings of the power transformer 30, thus reducing the differences between the average current values of the ignitron tubes T1 to T12 which might result from unbalanced voltages at the power leads L1, L2 and L3. The delta twelve-phase, sextuple zigzag, diametric rectifier connection also produces a smoother unidirectional current output at the direct-current leads D1 and D2 than for a six-phase rectifier connection.

Since numerous changes may be made in the above-described apparatus and circuits and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In an electric power translation system, including: unidirectional current power leads; three-phase alternating current power leads; twelve-phase power leads; transformer means connected between said three-phase power leads and said twelve-phase power leads; a plurality of separate, single-phase asymmetrically conducting devices of a type in which the rating is determined more by the peak current than by the average current carried by each of said devices; a delta, sextuple zigzag, diametric connection for providing twelve-phase connections and for operatively connecting said asymmetrically conducting devices between said unidirectional current power leads and the six pairs of diametrically opposite terminals of said twelve-phase power leads; and an interphase reactance means which is serially included in said connection means, said interphase reactance means comprising a plurality of magnetic core members, each of said core members having disposed thereon windings for developing the instantaneous voltage differences which are necessary to permit half of said asymmetrically conducting devices to operate in parallel with each other at all times.

2. In an electric power translation system, including: unidirectional current power leads; three-phase alternating power leads; twelve-phase power leads; transformer means connected between said three-phase power leads and said twelve-phase power leads; a plurality of separate single-phase vapor-electric devices, each having a single-phase space current between an anode means and a cathode means, each of said vapor-electric devices having its own individual cathode means; a delta, sextuple zigzag, diametric connection for providing twelve phase connections and for operatively connecting said vapor-electric devices between said unidirectional current power leads and the six pairs of diametrically opposite terminals of said twelve-phase power leads; and an interphase reactance means which is serially included in said connection means, said interphase reactance means comprising a plurality of magnetic core members, each of said core members having disposed thereon windings for developing the instantaneous voltage differences which are necessary to permit half of said vapor-electric devices to operate in parallel with each other at all times.

3. In an electric power translation system, including: unidirectional current power leads; three-phase alternating current power leads; twelve-phase power leads; transformer means connected between said three-phase power leads and said twelve-phase power leads; a plurality of separate, single-phase semiconductor rectifying devices, a delta, sextuple zigzag, diametric connection for providing twelve phase connections and for operatively connecting said semiconductor rectifying devices between said unidirectional current power leads and the six pairs of diametrically opposite terminals of said twelve-phase power leads; and an interphase reactance means which is serially included in said connection means, said interphase reactance means comprising a plurality of magnetic core members, each of said core members having disposed thereon windings for developing the instantaneous voltage differences which are necessary to permit half of said semiconductor rectifying devices to operate in parallel with each other at all times.

4. In an electric power translation system, including: unidirectional current power leads; three-phase alternating current power leads; twelve-phase power leads; transformer means connected between said three-phase power leads and said twelve-phase power leads; a plurality of separate, single-phase mercury-vapor gas tubes, each having an anode means and a cathode means, each of said mercury-vapor gas tubes having its own individual cathode means; a delta, sextuple zigzag, diametric connection for providing twelve phase connections and for operatively connecting said mercury-vapor gas tubes between said unidirectional current power leads and the six pairs of diametrically opposite terminals of said twelve-phase power leads; and an interphase reactance means which is serially included in said connection means, said interphase reactance means comprising a plurality of magnetic core members, each of said core members having disposed thereon windings for developing the instantaneous voltage differences which are necessary to permit half of said mercury-vapor gas tubes to operate in parallel with each other at all times.

5. In an electric power translation system, including: unidirectional current power leads; three-phase alternating current power leads; twelve-phase power leads; transformer means connected between said three-phase power leads and said twelve-phase power leads; a plurality of separate, single-phase, asymmetrically conducting devices of a type in which the rating is determined more by the peak current than by the average current carried by each of said devices; a delta, sextuple zigzag, diametric connection for providing twelve phase connections and for operatively connecting said asymmetrically conducting devices between said unidirectional current power leads and the six pairs of diametrically opposite terminals of said twelve-phase power leads, each of the twelve phase connections including four asymmetrically conducting devices in a bridge connection; and an interphase reactance means which is serially included in said connection means, said interphase reactance means comprising a plurality of magnetic core members, each of said core members having disposed thereon windings for developing the instaneous voltage differences which are necessary to permit half of said asymmetrically conducting devices to operate in parallel with each other at all times.

6. In an electric power translation system, including: unidirectional current power leads; three-phase alternating current power leads; twelve-phase power leads; transformer means connected between said three-phase power leads and said twelve-phase power leads; a plurality of separate, single-phase asymmetrically conducting devices of a type in which the rating is determined more by the peak current than by the average current carried by each of said devices; a delta, sextuple zigzag, diametric connection for providing six biphase connections and for operatively connecting said asymmetrically conducting devices between said unidirectional current power leads and the six pairs of diametrically opposite terminals of said twelve-phase power leads; and an interphase reactance means which is serially included in said connection means, said interphase reactance means comprising two three-phase magnetic core members and one single-phase magnetic core member, each of said core members having disposed thereon windings for developing the instantaneous voltage differences which are necessary to permit half of said asymmetrically conducting devices to operate in parallel with each other at all times.

7. In an electric power translation system, including: unidirectional current power leads; three-phase alternating current power leads; twelve-phase power leads; a transformer connected between said three-phase power leads and said twelve-phase power leads, said transformer including a primary winding and six separate zigzag connected secondary windings, said primary winding being connected to said three-phase power leads, said secondary windings each having a separate mid-tap lead and being connected to the six pairs of diametrically opposite terminals of said twelve-phase power leads; a plurality of separate, single-phase asymmetrically conducting devices of a type in which the rating is determined more by the peak current than by the average current carried by each of said devices; a delta, sextuple zigzag, diametric connection for providing six biphase connections and for operatively connecting said asymmetrically conducting devices between said unidirectional current power leads and the six pairs of diametrically opposite terminals of said twelve-phase power leads; and an interphase reactance means comprising a plurality of magnetic core members, each of said core members having disposed thereon windings for developing the instantaneous voltage differences which are necessary to permit half of said asymmetrically conducting devices to operate in parallel with each other at all times, said interphase reactance means being connected between one of said unidirectional power leads and said mid-tap leads of said secondary windings.

8. In an electric power translation system, including: unidirectional current power leads; three-phase alternating current power leads; twelve-phase power leads; a transformer connected between said three-phase power leads and said twelve-phase power leads, said transformer including a primary winding and six separate zigzag connected secondary windings, said primary winding being connected to said three-phase power leads, said secondary windings each having a separate mid-tap lead and being connected to the six pairs of diametrically opposite terminals of said twelve-phase power leads; a plurality of separate, single-phase, vapor-electric devices, each having a single phase space current between an anode means and a cathode means, each of said vapor-electric devices having its own individual cathode means, a delta, sextuple zigzag, diametric connection for providing twelve phase connections and for operatively connecting said asymmetrically conducting devices between said unidirectional current power leads and the six pairs of diametrically opposite terminals of said twelve-phase power leads; and an interphase reactance means comprising a plurality of magnetic core members, each of said core members having disposed thereon windings for developing the instantaneous voltage differences which are necessary to permit half of said vapor-electric devices to operate in parallel with each other at all times, said interphase reactance means being connected between one of said unidirectional power leads and said mid-tap leads of said secondary windings.

9. In an electric power translation system, including: unidirectional current power leads; three-phase alternating current power leads; twelve-phase power leads; a transformer connected between said three-phase power leads and said twelve-phase power leads, said transformer including a primary winding and six separate zigzag connected secondary windings, said primary winding being connected to said three-phase power leads, said secondary windings each having a separate mid-tap lead and being connected in two groups to provide two six-phase voltages each displaced in opposite phase relations with respect to the voltage of said primary winding to the six pairs of diametrically opposite terminals of said twelve-phase power leads; a plurality of separate, single-phase semiconductor rectifying devices, a delta, sextuple zigzag, diametric connection for providing, twelve rectifier phase connections for operatively connecting said semiconductor rectifying devices between said unidirectional current power leads and the six pairs of diametrically opposite terminals of said twelve-phase power leads; and an interphase reactance means comprising a plurality of magnetic core members, each of said core members having disposed thereon windings for developing the instantaneous voltage differences which are necessary to permit half of said asymmetrically conducting devices to operate in parallel with each other at all times, said interphase reactance means being connected between one of said unidirectional power leads and said mid-tap leads of said secondary windings.

10. In an electric power phase transformation system, including: first three-phase alternating current power leads; two other sets of three-phase alternating current power leads, said other sets of three-phase power leads differing from each other and from said first three-phase power leads by predetermined phase angles, transformer means connected between said first three-phase power leads and said other sets of three-phase power leads, said transformer means comprising a power transformer having a primary winding and six separate zigzag connected secondary windings, said primary winding being delta connected to said first three-phase power leads; a load means connected to said other sets of three-phase power leads; and a delta sextuple, zigzag diametric connection for operatively connecting said secondary windings to said other sets of three-phase power leads.

11. In an electric power translation system, the combination comprising, unidirectional current power leads; three-phase alternating current power leads; twelve-phase power leads; transformer means connected between said three-phase power leads and said twelve-phase power leads, said transformer means comprising two primary winding sections delta connected in parallel to said three-phase power leads and six separate zigzag connected secondary windings arranged in two groups of three windings each to produce two six-phase voltages each displaced in phase from said three-phase power leads by a predetermined angle in opposite directions; means conductively connecting the diametrically opposite ends of said secondary windings to said twelve-phase power leads; a plurality of separate, single-phase, asymmetrically conducting devices of the type in which the rating is determined more by the peak current than by the average current carried by each of said devices, said asymmetrically conducting devices being connected between said transformer means and said unidirectional leads in a delta, sextuple zigzag, diametric connection to conduct for substantially 180° of each cycle of said alternating current power leads; and interphase reactance means connected between said secondary windings and said unidirectional leads, said interphase reactance means comprising a plurality of magnetic core members and windings disposed thereon for developing the instantaneous voltage differences which are necessary to permit half of said asymmetrically conducting devices to operate in parallel at all times.

12. In an electric power translation system, the combination comprising, unidirectional current power leads; three-phase alternating current power leads; twelve-phase power leads; transformer means connected between said three-phase power leads and said twelve-phase power leads, said transformer means comprising two primary winding sections delta connected in parallel to said three-phase power leads and six separate zigzag connected secondary windings arranged in two groups of three windings each to produce two six-phase voltages each displaced in phase from said three-phase power leads by a predetermined angle in opposite directions; means conductively connecting the diametrically opposite ends of said secondary windings to said twelve-phase power leads; a plurality of separate, single-phase, vapor-electric devices each having a single-phase space current between an anode means and a cathode means, each of said devices having its own individual cathode means, said vapor-electric devices being connected between said transformer means and said unidirectional leads in a delta zigzag, sextuple, diametric connection to conduct for substantially 180° of each cycle of said alternating current power leads; and interphase reactance means connected between said secondary windings and said unidirectional leads, said interphase reactance means comprising a plurality of magnetic core members and windings disposed thereon for developing the instantaneous voltage differences which are necessary to permit half of said vapor-electric devices to operate in parallel at all times.

13. In an electric power translation system, the combination comprising, unidirectional current power leads; three-phase alternating current power leads; twelve-phase power leads; transformer means connected between said three-phase power leads and said twelve-phase power leads, said transformer means comprising two primary winding sections delta connected in parallel to said three-phase power leads and six separate zigzag connected secondary windings arranged in two groups of three windings each to produce two six-phase voltages each displaced in phase from said three-phase power leads by a predetermined angle in opposite directions; means conductively connecting the diametrically opposite ends of said secondary windings to said twelve-phase power leads; a plurality of separate single phase semiconductor rectifying devices of the type in which the rating is determined more by the peak current than by the average current carried by each of said devices, said semiconductor rectifying devices being connected between said transformer means and said unidirectional leads in a delta, sextuple zigzag, diametric connection to conduct for substantially 180° of each cycle of said alternating current power leads; and interphase reactance means connected between said secondary windings and said unidirectional leads, said interphase reactance means comprising a plurality of magnetic core members and windings disposed thereon for developing the instantaneous voltage differences which are necessary to permit half of said semiconductor rectifying devices to operate in parallel at all times.

14. In an electric power translation system, the combination comprising, unidirectional current power leads; three-phase alternating current power leads; twelve-phase power leads; transformer means connected between said three-phase power leads and said twelve-phase power leads, said transformer means comprising two primary winding sections delta connected in parallel to said three-phase power leads and six separate zigzag connected secondary windings arranged in two groups of three windings each to produce two six-phase voltages each displaced in phase from said three-phase power leads by a predetermined angle in opposite directions; means conductively connecting the diametrically opposite ends of said secondary windings to said twelve-phase power leads; a plurality of separate single-phase mercury vapor gas tubes each having an anode means and its own individual cathode means, said mercury vapor gas tubes being connected between said transformer means and said unidirectional leads in a delta, sextuple zigzag, diametric connection to conduct for substantially 180° of each cycle of said alternating current power leads; and interphase reactance means connected between said secondary windings and said unidirectional leads, said interphase reactance means comprising a plurality of magnetic core members and windings disposed thereon for developing the instantaneous voltage differences which are necessary to permit half of said mercury vapor gas tubes to operate in parallel at all times.

References Cited in the file of this patent

UNITED STATES PATENTS

| | | |
|---|---|---|
| 2,039,034 | Rose et al. | Apr. 28, 1936 |
| 2,231,604 | Stebbins | Feb. 11, 1941 |
| 2,602,152 | Storsand | July 1, 1952 |
| 2,825,022 | Boyer et al. | Feb. 25, 1958 |

FOREIGN PATENTS

| | | |
|---|---|---|
| 387,472 | Great Britain | Feb. 9, 1933 |